(12) United States Patent
Bogenberger et al.

(10) Patent No.: US 11,407,312 B2
(45) Date of Patent: Aug. 9, 2022

(54) CHARGING CABLE FOR A MOTOR VEHICLE WHICH CAN BE OPERATED BY ELECTRICITY

(71) Applicant: Bayerische Motoren Werke Aktiengesellschaft, Munich (DE)

(72) Inventors: Richard Bogenberger, Ebenhausen (DE); Harald Ernst, Theuern (DE); Sergey Kochetov, Munich (DE); Stephan Riess, Friedberg (DE); Volker Zwillich, Gilching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 133 days.

(21) Appl. No.: 16/508,079

(22) Filed: Jul. 10, 2019

(65) Prior Publication Data

US 2019/0344666 A1  Nov. 14, 2019

Related U.S. Application Data

(63) Continuation of application No. PCT/EP2017/083194, filed on Dec. 18, 2017.

(30) Foreign Application Priority Data

Jan. 12, 2017  (DE) ...................... 10 2017 200 421.5

(51) Int. Cl.
*B60L 3/00* (2019.01)
*B60L 53/14* (2019.01)
*H01F 17/06* (2006.01)

(52) U.S. Cl.
CPC ............. *B60L 3/0069* (2013.01); *B60L 53/14* (2019.02); *H01F 2017/065* (2013.01)

(58) Field of Classification Search
CPC .......... B60L 3/00; B60L 3/0069; B60L 53/14; H01F 201/065; H01F 2017/065
(Continued)

(56) References Cited

U.S. PATENT DOCUMENTS 3,093,747 A * 6/1963 Goodell .................. H03K 3/45
307/409
3,828,269 A * 8/1974 Norton .................... H03F 1/565
330/97

(Continued)

FOREIGN PATENT DOCUMENTS

CN 102055308 A 5/2011
CN 103138327 A 6/2013
(Continued)

OTHER PUBLICATIONS

PCT/EP2017/083194, International Search Report dated Feb. 22, 2018 (Three (3) pages).
(Continued)

*Primary Examiner* — Richard Isla
*Assistant Examiner* — Dung V Bui
(74) *Attorney, Agent, or Firm* — Crowell & Moring LLP

(57) ABSTRACT

A charging cable for a motor vehicle can be operated by electricity having a filter device. The charging cable includes a first conductor and a second conductor configured to transfer a current, a safety ground line, and a signal line configured to transfer charging information relating to a charging process. The filter device includes a core around which the first and second conductors and the safety ground line are wound, and the signal line is wound around the core.

5 Claims, 1 Drawing Sheet

(58) Field of Classification Search
USPC .......................................................... 320/109
See application file for complete search history.

(56) References Cited

U.S. PATENT DOCUMENTS

| | | | |
|---|---|---|---|
| 5,635,828 A | 6/1997 | Yoshizawa et al. | |
| 6,624,745 B1* | 9/2003 | Wilier | H04L 12/2838 |
| | | | 375/258 |
| 8,896,315 B1* | 11/2014 | Davies | H02J 7/0019 |
| | | | 324/434 |
| 2005/0133245 A1 | 6/2005 | Katsuyama et al. | |
| 2008/0315971 A1* | 12/2008 | Radtke | H02M 1/126 |
| | | | 333/177 |
| 2013/0154362 A1* | 6/2013 | Takaka | H02H 9/042 |
| | | | 307/9.1 |
| 2013/0342008 A1* | 12/2013 | Takata | H04B 3/548 |
| | | | 307/9.1 |
| 2014/0191720 A1* | 7/2014 | Sugiyama | B60L 58/21 |
| | | | 320/109 |
| 2014/0355452 A1* | 12/2014 | Nii | B60R 16/023 |
| | | | 370/242 |
| 2015/0061584 A1* | 3/2015 | Okada | B60L 53/60 |
| | | | 320/108 |
| 2015/0217654 A1 | 8/2015 | Woo et al. | |
| 2015/0255209 A1* | 9/2015 | Ludois | H01F 3/02 |
| | | | 361/270 |
| 2016/0250939 A1 | 9/2016 | Shin | |
| 2017/0368951 A1* | 12/2017 | Adlhoch | B60L 53/665 |

FOREIGN PATENT DOCUMENTS

| | | |
|---|---|---|
| CN | 104135148 A | 11/2014 |
| CN | 104221228 A | 12/2014 |
| CN | 204304557 U | 4/2015 |
| DE | 42 17 424 A1 | 12/1993 |
| DE | 694 20 817 T2 | 5/2000 |
| EP | 2 846 435 A1 | 3/2015 |
| EP | 3 133 743 A1 | 2/2017 |
| JP | 2012-169143 A | 9/2012 |
| JP | 2015-207817 A | 11/2015 |

OTHER PUBLICATIONS

German Search Report issued in German counterpart application No. 10 2017 200 421.5 dated Oct. 13, 2017, with Statement of Relevancy (Seven (7) pages).

German Office Action issued in German counterpart application No. 10 2017 200 421.5 dated Oct. 23, 2017 (Seven (7) pages).

Chinese Office Action issued in Chinese application No. 201780082906.4 dated Jan. 26, 2022, with English translation (Fourteen (14) pages).

* cited by examiner

CHARGING CABLE FOR A MOTOR VEHICLE WHICH CAN BE OPERATED BY ELECTRICITY

CROSS REFERENCE TO RELATED APPLICATIONS

This application is a continuation of PCT International Application No. PCT/EP2017/083194, filed Dec. 18, 2017, which claims priority under 35 U.S.C. § 119 from German Patent Application No. 10 2017 200 421.5, filed Jan. 12, 2017, the entire disclosures of which are herein expressly incorporated by reference.

BACKGROUND AND SUMMARY OF THE INVENTION

The invention relates to a charging cable for an electrically operable motor vehicle having a filter device.

A charging cable for electrically operable motor vehicles, such as e.g. a plugin hybrid motor vehicle or a motor vehicle operable purely by electric motor, comprises two conductors that are used for transferring a current. The charging cable further comprises a safety ground line and a signal line, wherein the latter is used for transferring charging information relating to a charging process. The filter device comprises a core around which the first and second conductors and the safety ground line are wound.

The use of filter devices for spark suppression and compliance with legal guidelines, e.g. according to ECE-R10, is known generally. The filter devices used are interference suppression inductors and current-compensated inductors, for example.

A charging cable that is currently used for an electrically operable vehicle and that is installed in the vehicle between a charging socket (charging plug) and a charger arranged in physical proximity to the energy store in the vehicle has the conductors for transferring a charging current and the safety ground line wound around the core of the filter device. This is depicted in exemplary fashion in FIG. 1. The charging cable is schematically denoted by the reference sign 10. The filter device bears the reference sign 20, wherein merely a detail from a core 21 of the filter device 10 is shown for this. The conductors L and N used for the current transfer are wound around the core 21 in the same sense. Additionally, the safety ground line PE is wound around the core 21 in the opposite direction of rotation from the conductors L, N. A small number of windings for the safety ground line PE restricts a potential attenuation property, since the higher inductance is not permissible in the PE conductor from the point of view of signal integrity. The winding of the conductor N (what is known as the neutral conductor) and of the conductor L (what is known as the live conductor) in the same sense achieves what is known as common mode filtering. It is not possible for the live conductors N and L to be wound in opposite senses on account of rapid saturation of the material of the core 21.

For the purpose of transferring charging information relating to a charging process, there is provision, beyond that, for a signal line, which is not depicted in FIG. 1. The signal line is usually routed as a separate cable in physical proximity to the charging cable. Undesirable impedance in the PE conductor can round the signal currents, leading to the signal integrity problems.

This results in the problem that the signal integrity of the charging information transferred via the signal conductor does not or at least to some extent does not exist. Consequently, it may be that a charging process performed for the electrically operated motor vehicle is repeatedly terminated.

It is an object of the invention to provide a charging cable for an electrically operable motor vehicle in the case of which the signal integrity exists without adversely affecting the interference suppression properties of a filter apparatus of the charging cable.

A charging cable for an electrically operable motor vehicle having a filter device is proposed. The electrically operable motor vehicle may be a hybrid electric motor vehicle that has both an internal combustion engine and an electric motor drive. By way of example, a hybrid electric vehicle (HEV) of this kind may be provided as a plugin hybrid vehicle or electric vehicle (BEV). The electrically operable motor vehicle may also be a purely electrically operable motor vehicle in the case of which the energy required for the drive of the motor vehicle is provided from an electrochemical energy store (battery or storage capacitor).

The charging cable comprises a first conductor and a second conductor for transferring a current. One of the two conductors is a neutral conductor in this case. The charging cable further comprises a safety ground line. The current flowing via the first and second conductors for transferring current can return via the safety ground line. Further, the charging cable comprises a signal line for transferring charging information relating to a charging process. For example data, relating to a required amount of current, a maximum charging current, a charging time and the like, are interchanged via the signal line.

The filter device comprises a core. The first and second conductors and the safety ground line are wound around the core. The charging cable is distinguished in that the signal line is further also wound around the core.

The invention is based on the consideration of eliminating the undesirable series inductance in the PE conductor to pilot conductor runs that arise in an arrangement known from the prior art as shown in FIG. 1 by virtue of the signal line also being wound around the core. This allows interference suppression to be effected without influencing the information transfer in a disadvantageous manner. A further advantage is that the signal line, which is hitherto provided as a separate cable in addition to the charging cable in a motor vehicle, can be integrated into the charging cable. At the same time, the charging cable permits a high level of attenuation, i.e. a high level of filtering of the current transfer, to be ensured.

In one expedient configuration, the first conductor and the second conductor, which are used for the current transfer, are wound around the core in the same sense in a first direction of rotation. Beyond that, the safety ground line and the signal line are wound around the core in the same sense in a second direction of rotation. In this context, there is provision for the first and second directions of rotation to be opposite directions of rotation from one another. The first and second directions of rotation in opposite senses mean that the filter for the current transfer between the first and second conductors does not influence the data transfer in the signal line in a desirable manner. As a result, the desirable high level of filter attenuation can be realized without interference in the information transfer.

According to a further expedient configuration, the core is formed from a nanocrystalline material (e.g. VAC Vitoperm 500F). The core can have the shape of a toroid with a length of from 4 to 5 cm. The core diameter around which the first and second conductors and the safety ground line and the signal line are wound has a diameter of from approximately 0.5 cm to 1.5 cm in its winding section.

The filter apparatus is expediently arranged close to a respective end of the first and second conductors, the safety line and the signal line, which, when the charging cable is in the installed state in the motor vehicle, are connected to respective contacts of a charging socket of the motor vehicle.

The filter apparatus is in particular an integral part of the charging cable. The charging cable and the filter apparatus can be considered together as part of a wiring harness. Furthermore, the invention is distinguished in that the signal line for transferring charging information relating to a charging process is part of the charging cable. This means that, in contrast to the charging cable known from the prior art, the signal line does not need to be laid as a separate line in addition to the charging cable with the filter device in the motor vehicle.

The invention is explained in more detail below on the basis of an exemplary embodiment in the drawing, in which:

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
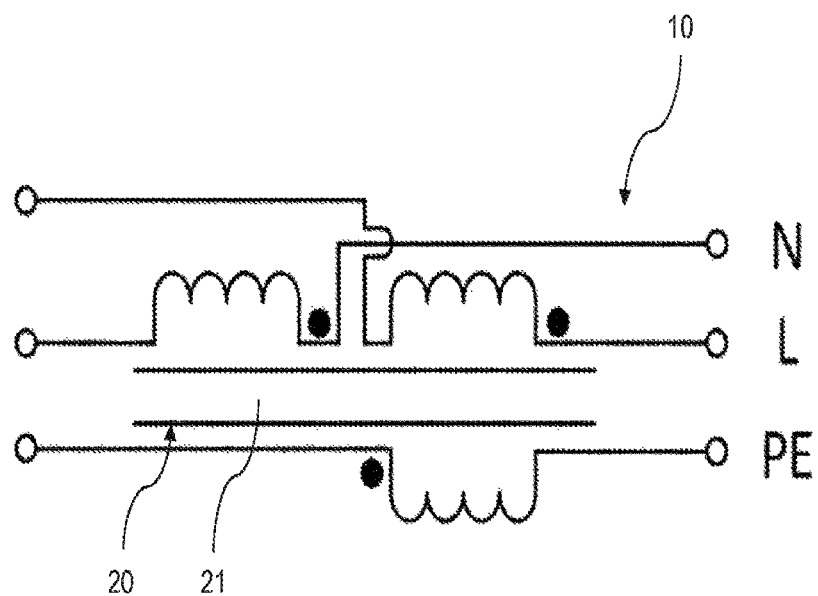
FIG. 1 shows a schematic depiction of a charging cable known from the prior art with a filter device.
Figure 2:
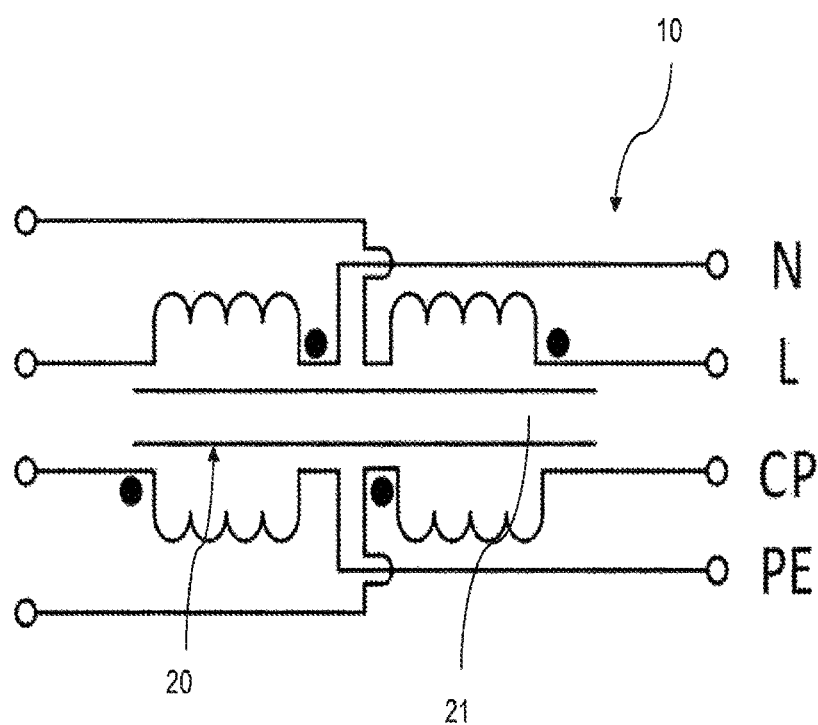
FIG. 2 shows a charging cable designed according to the invention.

The charging cable designed according to the invention that is shown in FIG. 2 comprises a first conductor L and a second conductor N (neutral conductor). The first conductor L and the second conductor N are used for transferring a current. Also, the charging cable comprises a safety ground line PE and a signal line CP. The signal line CP is used for transferring charging information relating to a charging process. During communication via the charging cable, the safety ground line PE is used as a return conductor for the signal line CP.

The charging cable further comprises a filter device 20 as an integral part. The filter device comprises a core 21, which is depicted merely schematically in FIG. 2. In particular, merely that section of the core 21 around which the first and second conductors L, N, the safety ground line PE and the signal line CP are wound is depicted.

As emerges from the schematic depiction of FIG. 2, the first conductor L and the second conductor N are wound around the core 21 in the same sense in a first direction of rotation. The safety ground line PE and the signal line CP are likewise wound around the core 21 in the same sense in a second direction of rotation, which is opposite to the first direction of rotation. This type of winding means that the filter device 20 does not influence the data transfer via the signal line CP during the current transfer between the first conductor L and the second conductor N. Beyond that, a high level of filter attenuation can be achieved.

As a result of the signal line also being wound around the core, the signal line is an integral part of the charging cable.

The filter apparatus is arranged close to a respective end of the first and second conductors L, N, the safety line PE and the signal line CP which, when the charging cable 10 is in the installed state in the motor vehicle (not depicted), are connected to respective contacts of a likewise undepicted charging socket of the motor vehicle.

It should be emphasized that the present charging cable is a charging cable installed inside the motor vehicle that connects the contacts of the aforementioned charging socket to a charger for charging the energy store of the motor vehicle. The charging socket is then connected, by means of a further, normally external charging cable, to a grid connection or a charging post for charging the energy store.

The proposed charging cable installed in the motor vehicle is intended to suppress interference for a component of the vehicle by using the filter device provided in the charging cable. The filter device may be arranged in a housing, which is in particular sealed from ambient influences. The core of the filter device is in particular in the form of an annular core, wherein the shape thereof can also have the shape of a rectangle or square.

The core 21 of the filter device is in particular made from a nanocrystalline material in order to ensure good interference suppression.

LIST OF REFERENCE SIGNS

10 Charging cable
20 Filter device
21 Core
L First conductor
N Second conductor
PE Safety ground line
CP Signal line The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A charging cable for an electrically operable motor vehicle having a filter device, wherein the charging cable comprises:
   a first conductor and a second conductor configured to transfer a current;
   a safety ground line; and
   a signal line configured to transfer charging information relating to a charging process,
   wherein the filter device comprises a core around which the first and second conductors and the safety ground line are wound,
   wherein the signal line is wound around the core,
   wherein the first conductor and the second conductor are wound around the core in a same sense in a first direction of rotation,
   wherein the safety ground line and the signal line are wound around the core in a same sense in a second direction of rotation, and
   wherein the first direction and the second direction of rotation are mutually opposite directions of rotation.

2. The charging cable according to claim 1, wherein the core is made of a nanocrystalline material.

3. The charging cable according to claim 1, wherein the core has the shape of a toroid with a length from 4 to 5 cm.

4. The charging cable according to claim 1, wherein the core has a diameter of 0.5 cm to 1.5 cm.

5. The charging cable according to claim 1,
wherein the filter device is arranged close to a respective end of the first and second conductors, and
wherein the safety ground line and the signal line are connected to respective contacts of a charging socket of the motor vehicle when the charging cable is in an installed state in the motor vehicle.

* * * * *